H. PETERS.
KNITTING MACHINE.
APPLICATION FILED NOV. 18, 1911.
1,120,332.
Patented Dec. 8, 1914.
7 SHEETS—SHEET 6.
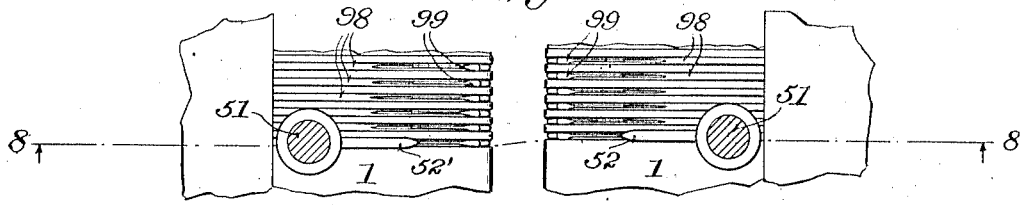
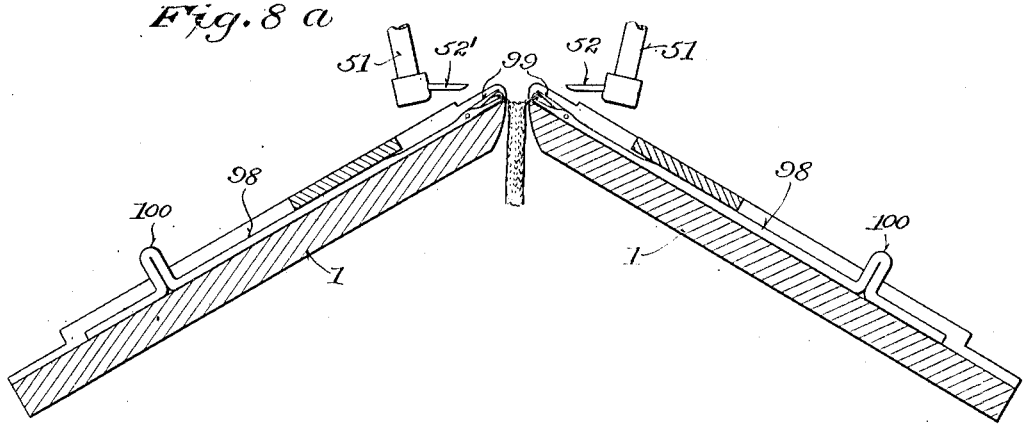
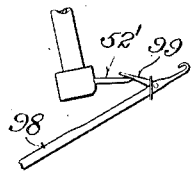
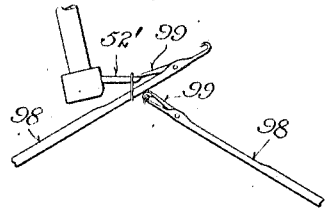
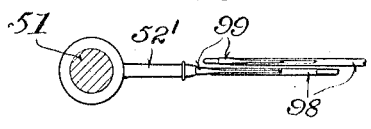
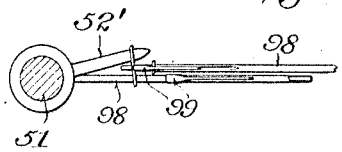
Witnesses:
Fred Palm
Chas. L. Goss.
Inventor:
Herman Peters
By Landis Bottum Lawrence & Bottum
Attorneys.

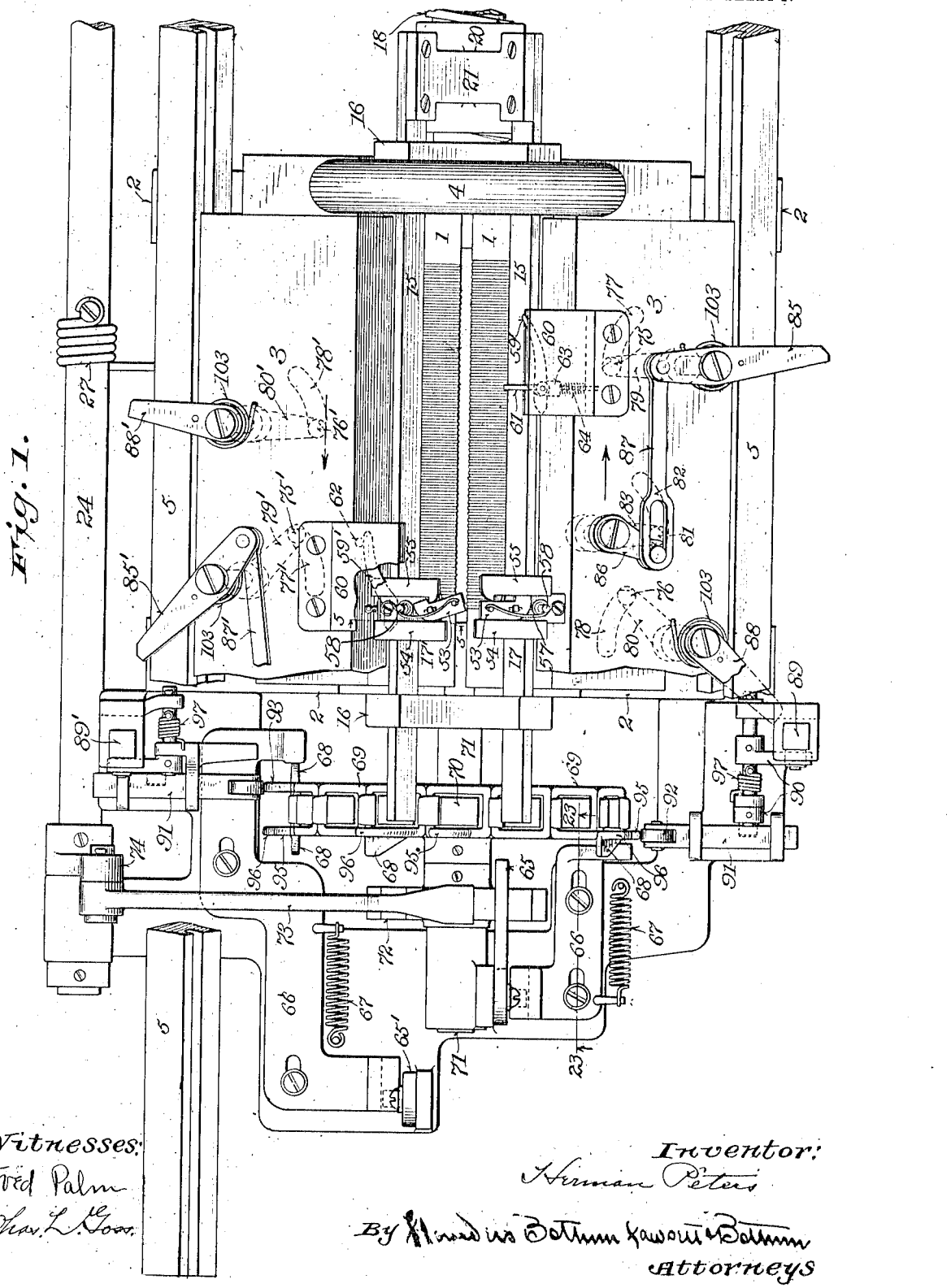

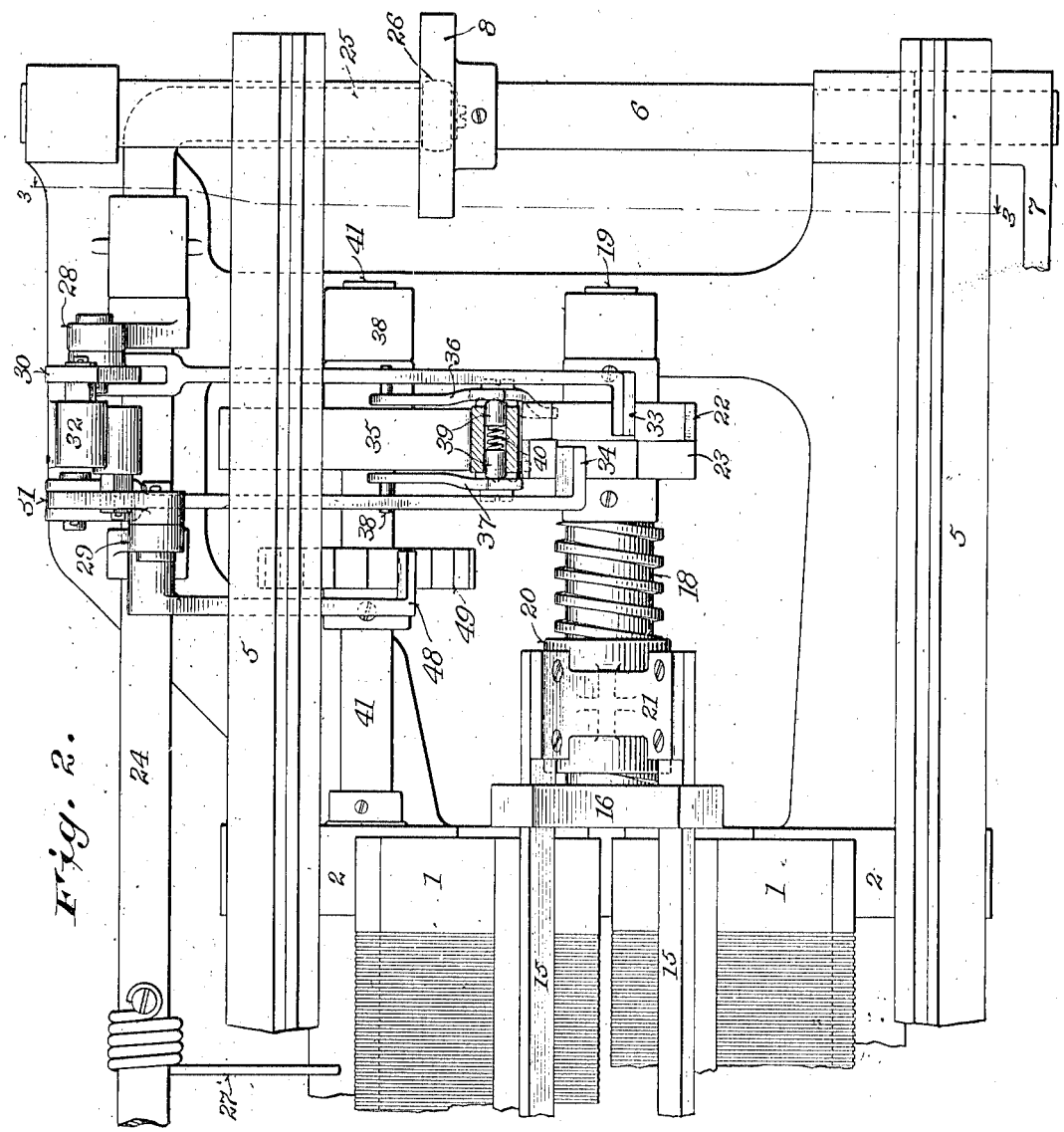

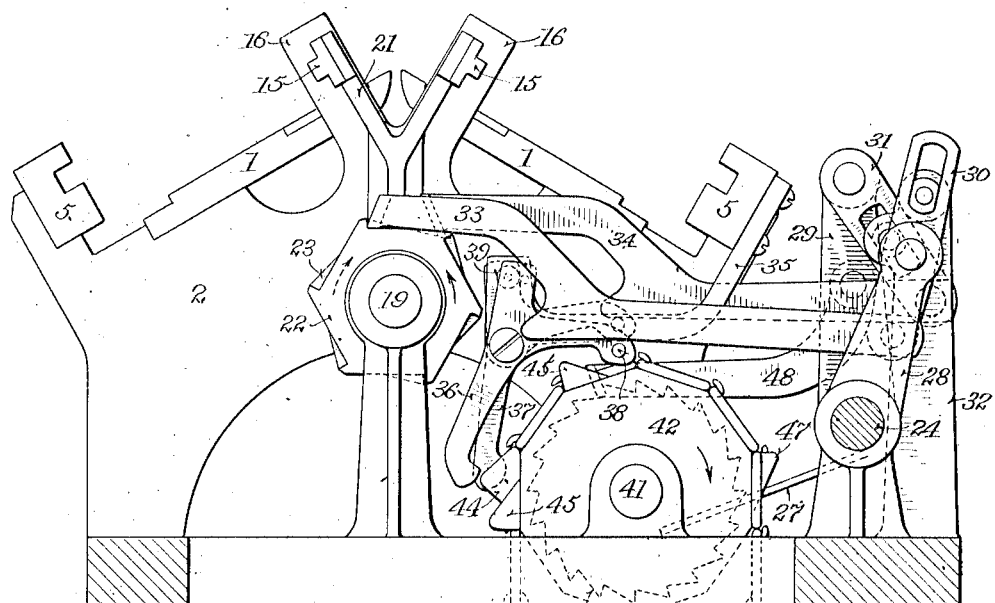
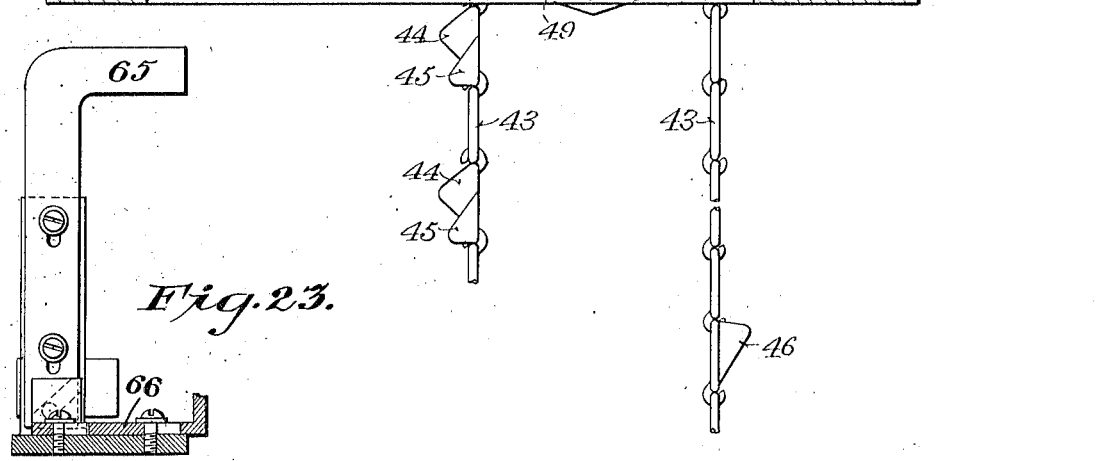

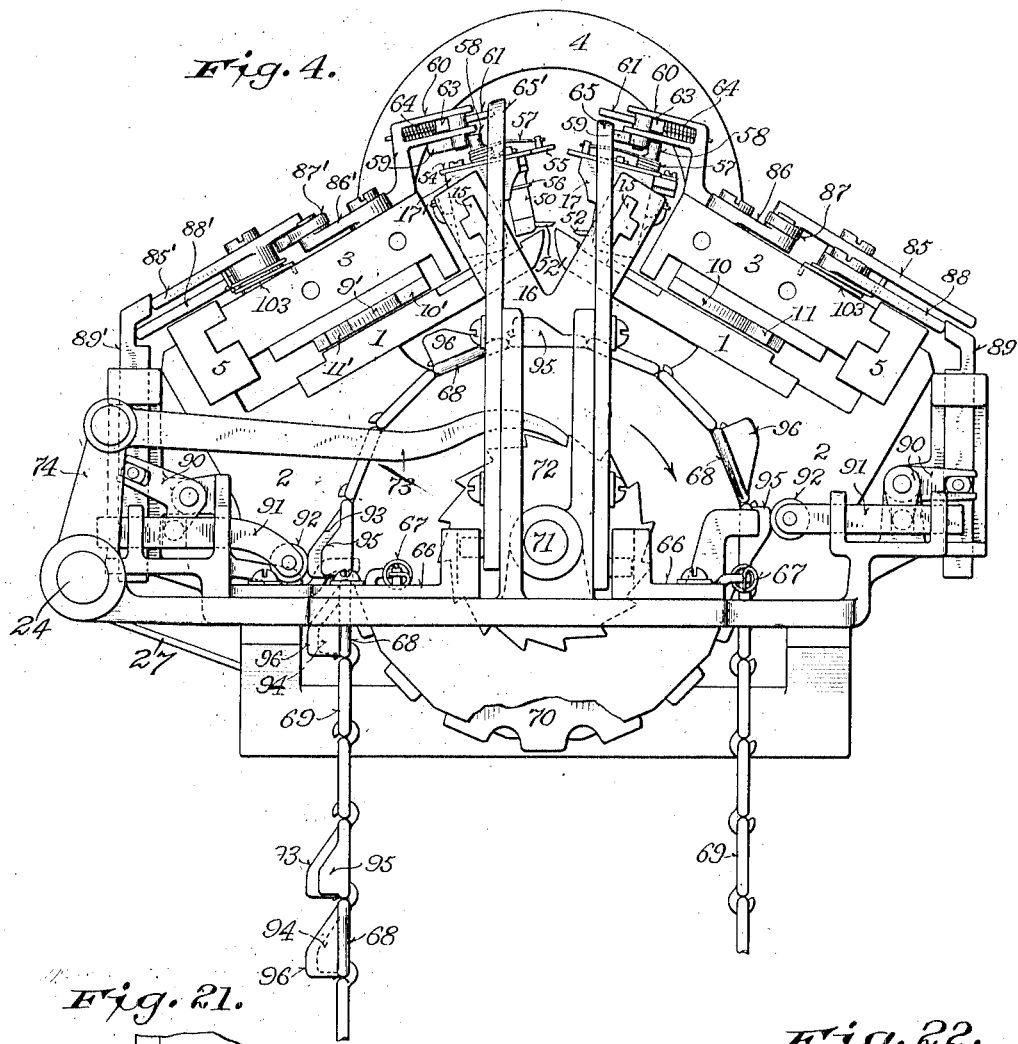
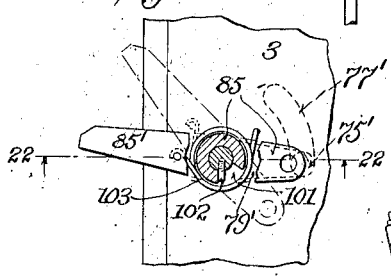
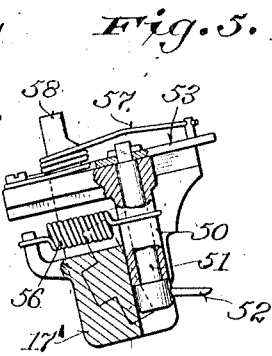
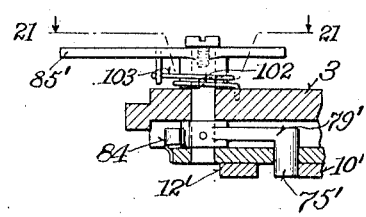

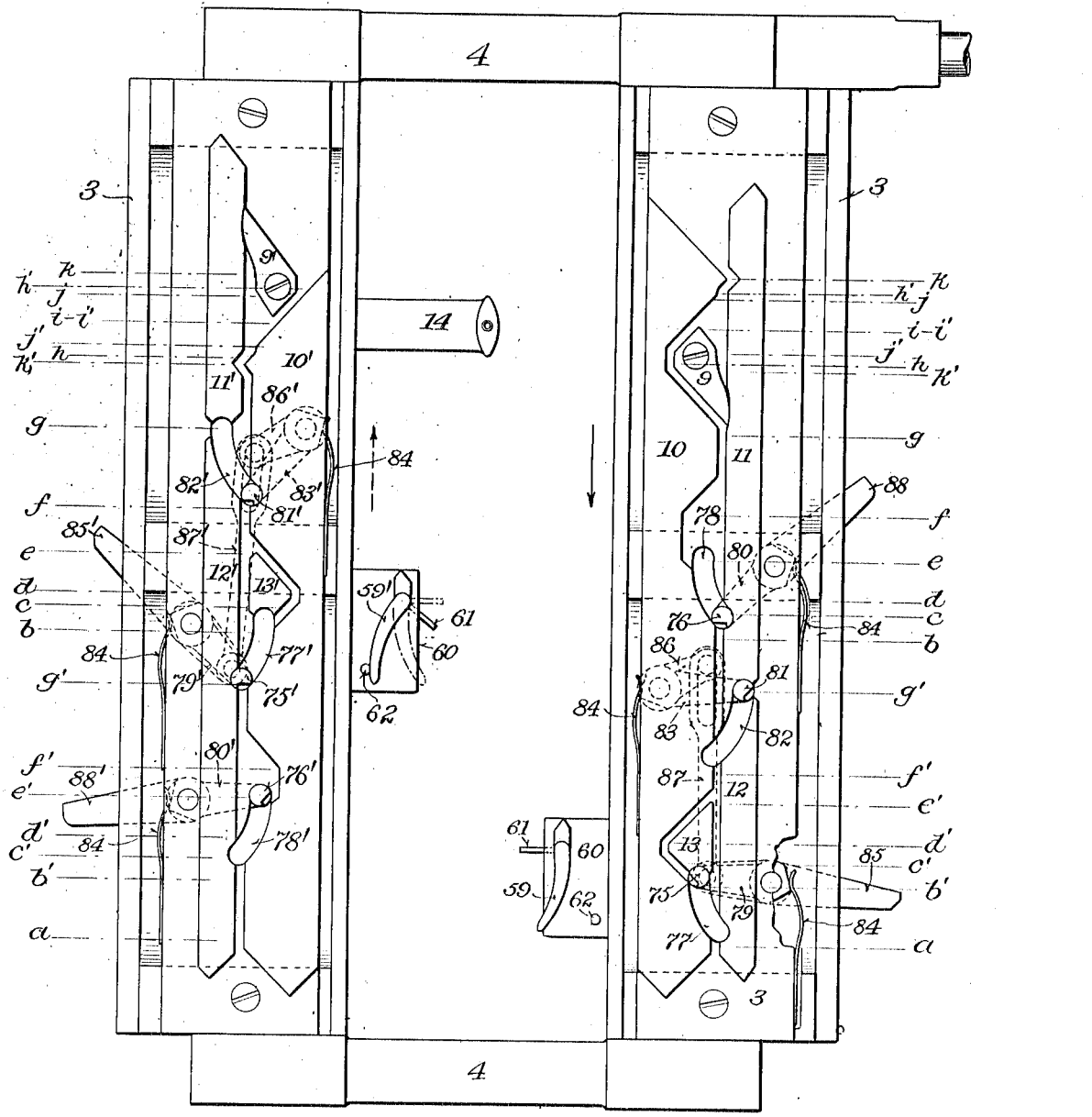

H. PETERS.
KNITTING MACHINE.
APPLICATION FILED NOV. 18, 1911.
1,120,332.
Patented Dec. 8, 1914.
7 SHEETS—SHEET 7.
Fig. 13. d
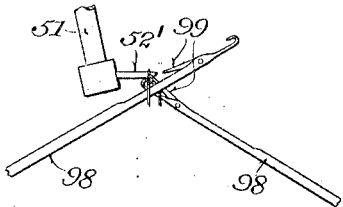
Fig. 14 e
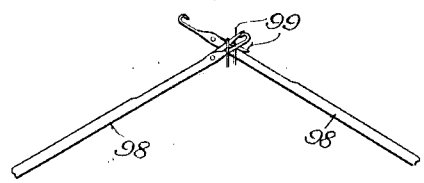
Fig. 15 f
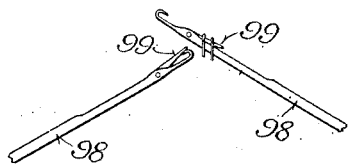
Fig. 16 g
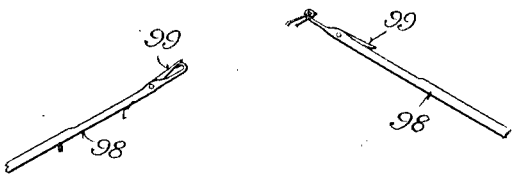
Fig. 17 h
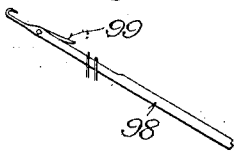
Fig. 18 i
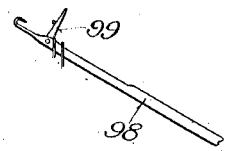
Fig. 19 j
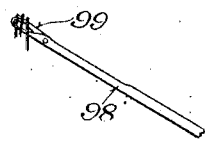
Fig. 20 k
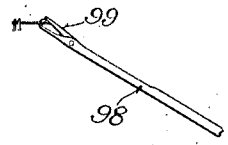
Witnesses:
Fred Palm
Chas. L. Goss.
Inventor:
Herman Peters
By Flanders Bottum Fawcett & Bottum
Attorneys.

UNITED STATES PATENT OFFICE.

HERMAN PETERS, OF MILWAUKEE, WISCONSIN, ASSIGNOR TO HOLEPROOF HOSIERY CO., OF MILWAUKEE, WISCONSIN, A CORPORATION OF WISCONSIN.

KNITTING-MACHINE.

1,120,332. Specification of Letters Patent. Patented Dec. 8, 1914.

Application filed November 18, 1911. Serial No. 661,082.

*To all whom it may concern:*

Be it known that I, HERMAN PETERS, a citizen of the United States, residing at Milwaukee, in the county of Milwaukee and State of Wisconsin, have invented certain new and useful Improvements in Knitting-Machines, of which the following is a specification, reference being had to the accompanying drawing, forming a part thereof.

This invention relates to knitting machines known as "straight" or "parallel row" machines, in which the needles are arranged in two parallel rows pointing toward an intervening slot or opening across which they are projected in knitting. Its main object is to automatically fashion or narrow seamless tubular articles, and generally to improve the construction, operation and product of machines of this class.

It consists essentially in means for automatically and progressively and alternately transferring loops from the needles of one row to needles of the other row and then putting the needles from which loops have been removed, out of action.

It consists further in the construction, arrangement and combination of parts as hereinafter particularly described and pointed out in the claims.

In the accompanying drawing like characters designate the same parts in the several figures.

Figure 1 is a plan view of that end of a knitting machine embodying the invention where the transfer of loops from needles of one row to needles of the other row takes place; Fig. 2 is a plan view of the other end of the machine; Fig. 3 is a cross section on the line 3 3, Fig. 2; Fig. 4 is an end elevation as viewed from the left relative to Fig. 1; Fig. 5 is an enlarged sectional detail view of one of the transfer heads and points, the plane of the section being indicated by the line 5 5, Fig. 1; Fig. 6 is an inverted plan view of the cam carriage needle actuating cams, and needle lifters and droppers, the two sides of the carriage being shown in the same horizontal plane; Fig. 7 is an enlarged plan view of portions of the two needle plates or beds and of the two rows of needles with the transfer points in normal position relative thereto; Fig. 8 is a cross section on a less enlarged scale in a plane indicated by the dotted line 8 8, Fig. 7; Figs. 9 to 20 inclusive are diagrams illustrating successive operations of a transfer point and of a pair of needles in transferring a loop from one needle to the other, withdrawing one needle from the field of action and knitting with the remaining needle, Figs. 11 and 12, which are plan views of the parts as shown in Figs. 10 and 13 respectively, being drawn on a larger scale than the other figures; Figs. 21 and 22 are detail sectional views of one of the trip levers for shifting one of the needle lifters and the needle dropper on each side of the machine into operative position, Fig. 21 being a horizontal section on the line 21 21, Fig. 22, and Fig. 22 a vertical section on the line 22 22, Fig. 21; and Fig. 23 is a section on the line 23 23, Fig. 1, showing in front elevation one of the trips for turning the transfer-point-shifting cams into operative position.

The terms "right" and "left" as herein used, refer to Figs. 1 and 2, in which the "front" side of the machine appears at the bottom, and the "rear" side at the top of said figures. In Fig. 6, the right hand end of the carriage appears at the bottom of the figure, and the front of the carriage on the right hand side of the figure.

Referring more particularly to Fig. 1, transversely grooved needle plates or beds 1, are supported at their ends at an oblique angle and parallel with each other by the frame members 2, a slot or narrow opening being left for the passage of the work between the inner and upper edges of these plates or beds as usual in this type of knitting machines.

A reciprocating carriage comprising two parallel side members 3, connected with each other at the ends by arches 4, is supported and guided over and parallel with the needle plates or beds 1 by the grooved parallel ways 5 which are attached to and supported by the frame in the usual or any suitable manner.

At one end of the machine a transverse driving shaft 6, mounted in suitable bearings on the frame, is provided with a crank 7 for turning it by hand, and with a cam 8. The carriage may be connected on one side of the machine by a rod (not shown) with the crank 7 in the usual manner, or it may be connected with the driving shaft in any other suitable manner, for imparting the required reciprocating movement to the cams. The shaft 6 may be provided with means for turning it by power as well as by hand.

As shown in Fig. 6, the carriage is provided on the under side with two sets of needle cams and guides 9, 10, 11, 12 and 13 and 9', 10', 11', 12' and 13'. The pivoted cams 9 9' and the adjacent ends of the cams and guides 10 and 11 and 10' and 11' are like or similar in construction and operation to the cams with which machines of this class are commonly provided for ordinary straight knitting. The carriage is also provided with a yarn carrier or guide 14, for feeding yarn to the needles of the front row as their butts descend between the cams 9 and 10 and to the needles of the rear row as their butts descend between the cams 9' and 10' in the usual way.

The machine as thus far described is like or similar in construction and operation to the well known straight or parallel row machines for straight tubular knitting.

To adapt a machine of this type for knitting fashioned or narrowed seamless tubular articles such as fashioned hose according to the present invention, the machine is provided with means for transferring loops alternately from the end needle of one row to the opposite end needle of the other row, and means for throwing the needles from which the loops have been removed, out of action.

Upon two bars 15, which are mounted and movable lengthwise above and parallel with the needle plates or beds 1, in brackets extending upwardly from the frame members 2, are mounted transfer heads or blocks 17 and 17', opposite the other head or block, as shown in Figs. 1 and 4. A longitudinal screw 18 mounted in suitable bearings in the frame adjacent to one end of the needle plates 1, is provided with a nut 20 which is connected by a bracket 21 with the adjacent ends of the bars 15, as shown in Figs. 1, 2 and 3. The screw 18 is provided with two reversely operating ratchet wheels 22 and 23, fixed thereon side by side.

A longitudinal rocker shaft 24, supported at the back side of the machine in bearings on the frame parallel with the ways 5, has at one end, as indicated by dotted lines in Fig. 2, an arm 25, extending underneath the shaft 6 and provided with a roller 26 which is held in contact with the periphery of the cam 8 by a spring 27.

As shown in Figs. 2 and 3, the rocker shaft 24 is provided with two upwardly projecting arms 28 and 29, which are pivoted at their upper ends to slotted levers 30 and 31 having sliding fulcrums on a post 32 rising from the frame of the machine. Pawls 33 and 34 pivoted to the lower ends of the levers 30 and 31 respectively, are arranged to work with the ratchet wheels 22 and 23 and to turn the screw 18 in opposite directions.

To opposite sides of an arm 35 attached to and extending forwardly from the rear carriage way 5, are pivoted two elbow-shaped pawl lifters 36 and 37, the rearwardly projecting arms of which are provided with pins 38 for lifting and holding the pawls 33 and 34 out of engagement with the ratchet wheels 22 and 23. Cone pointed detents 39 loosely inserted in a transverse opening through the arm 35 and pressed outwardly by a spring 40 engaging with sockets or depressions in the upwardly projecting arms of the pawl lifters 36 and 37, retain said lifters in either of their two positions.

On a shaft 41 between and parallel with the screw 18 and shaft 24, a sprocket or chain wheel 42 is mounted below the arm 35 with its periphery adjacent to the ends of the rearwardly and downwardly extending arms of the pawl lifters 36 and 37. A link belt or chain 43 is mounted on the sprocket or chain wheel 42 and provided at intervals along one side and in different planes with high and low projections 44 and 45, which are adapted to engage alternately with the ends of the downwardly and rearwardly projecting arms of the pawl lifter 36 and to alternately lower and lift the pawl 33 into and out of operative position relative to the ratchet wheel 22. The belt or chain 43 is provided on the opposite side in different planes with high and low porjections 46 and 47, which are adapted to alternately engage with the ends of the downwardly and rearwardly projecting arms of the pawl lifter 37 and lower and lift the pawl 34 into and out of operative position relative to the ratchet wheel 23. The distance between the two projections 46 and 47 for operating the pawl lifter 37 corresponds with the number and arrangement of the projections 44 and 45 on the other side of the belt or chain for operating the pawl lifter 36, in order to return the transfer heads or blocks 17 and 17' to their original position after they have been successively advanced to the right by the intermittent operation of the pawl 33 with the ratchet wheel 22. A pawl 48, pivoted to the arm 29 and working with a ratchet wheel 49 on the shaft 41, turns the chain wheel 42 step by step, two steps to each link of the chain 43 and one step to each revolution of the driving shaft 6 and each complete reciprocation of the cam carriage forward and back.

As shown in Figs. 1, 4 and 5, each head or block 17 and 17' is provided with a vertically disposed transversely movable sleeve or bearing 50. A spindle 51 rotatably fitted in the sleeve or bearing 50, is provided at its lower end with a transfer point 52 or 52' and at its upper end with an arm 53.

As shown in Fig. 4, the bearing 50 is guided in a path at a vertical angle to the path of the needle below it so that as the transfer point 52 or 52' and the needle are advanced toward the slot or opening between the plates 1, they will approach each other. The points 52 and 52' are normally held as shown in Fig. 7, in the same vertical planes with the needles below them by guides 54 and 55, between which the arms 53 are confined at the top of the heads or blocks 17 and 17'. A retracting spring 56 connecting the sleeve or bearing 50 with an arm on the outer side of each of the heads or blocks 17 and 17', holds said sleeve or bearing normally in its retracted position, as shown in Fig. 5. The outer end of the arm 53 and the inner end of the guide 55 of each of said heads are formed with interacting projections or shoulders which by engagement with each other, when the sleeve or bearing 50 approaches the limit of its inward movement, turn the arm 53 and the transfer point 52 or 52' horizontally to one side, as shown in Figs. 1 and 12. A retracting spring 57 connected at one end with the arm 53 and coiled at the other end around and fastened to a pin or post 58, extending upwardly from the head or block 17 or 17', turns the arm 53 with the point 52 or 52' back to its original position parallel with the guides 54 and 55 as the sleeve or bearing 50 is withdrawn by the spring 56 to its normal position.

The transfer points 52 and 52' are moved inwardly into position to coöperate with a pair of needles by cams 59 and 59' which are pivoted to the under side of brackets 60 attached to and overhanging the inner sides of the cam plates or members 3, and are movable into and out of position to engage with the pins or posts 58 on the heads or blocks 17 and 17'. The cams 59 and 59' are provided at their pivoted ends with inwardly projecting arms 61 for turning them outwardly into operative position, and their outward movement is limited by stops 62 on the brackets 60.

As shown in Figs. 1 and 4, friction shoes 63 are pressed by springs 64 against the hubs of the arms 61 and thereby prevent the cams 59 and 59' from being jarred out of place.

The machine is provided with trips 65 and 65' which are movable vertically into and out of range with the arms 61 of the cams 59 and 59'. The trips 65 and 65' are operated by slides 66 having inclined slots engaging lateral pins or projections on the lower ends of the trips, as shown in Figs. 1 and 23. The slides 66 are retracted and the trips 65 and 65' are held in normal position out of range with the arms 61 by springs 67, and the slides are alternately shifted against the tension of the springs 67 to thrust the trips 65 and 65' upward into operative position by laterally projecting inclined wings 68 on opposite sides of a link belt or chain 69 which is mounted on a sprocket or chain wheel 70. The wheel 70 is mounted on a shaft 71 parallel with the rocker shaft 24, and is turned step by step by a ratchet wheel 72 mounted on said shaft and working with a pawl 73 which is pivoted to an arm 74 on the rocker shaft 24. Each complete vibration of the pawl 73 with the arm 74 turns the sprocket or chain wheel 70 a distance corresponding with the length of one link of the belt or chain 69.

In order to narrow in knitting seamless tubular articles with the mechanism herein described, it is necessary to progressively and alternately advance the needles in pairs adjacent to one end of the needle plates 1 simultaneously with and in a certain relation to the transfer points. This is accomplished as follows: As shown in Figs. 1, 4 and 6, the cam carriage is provided on opposite sides with needle lifters 75, 75', 76 and 76', which are movable in curved slots 77, 77', 78 and 78' in the under side of the carriage into and out of the normal path of the needle butts and are adapted when set in the passages between the cams 10, 11 and 12, and 10', 11' and 12', as shown in Fig. 6, to pick up and lift or advance a single pair of end needles from opposite rows. These lifters project downwardly into the slots 77, 77', 78 and 78' from the inner ends of arms 79, 79', 80 and 80', which are pivoted at their outer ends to and between the upper and lower plates of the side members 3 of the carriage, as shown in Fig. 22. The lifter 75 or 75' on either side of the carriage coöperates with the lifter 76' or 76 respectively on the opposite side and lifts or advances the needle with which it engages a little ahead of the opposite needle engaged by the lifter 76' or 76. The carriage is also provided on each side with a needle dropper 81 or 81', movable in a curved slot 82 or 82' in the under side of the carriage into and out of the normal path of the needle butts between the cams or guides 10, 11 and 12, or 10', 11' and 12', and attached to the outer end of an arm 83 or 83' pivoted between the upper and lower plates of the corresponding side member 3 of the carriage. The several lifters and droppers are held in either of their extreme positions against accidental displacement by springs 84 pressing against the squared hubs of the arms 79, 79', 80, 80', 83 and 83'. The droppers 81 and 81' are connected with the lifters 75 and 75', so as to be simultaneously moved into operative position therewith by levers 85 and 85' and arms 86 and 86', which are mounted on the pivot pins of the arms 79, 79', 83 and 83', and are connected by slotted rods 87 and 87' on the upper side of the carriage. The levers 85 and 85' are loosely mounted on the pivot pins of the arms 79 and 79' and are extended outwardly therefrom beyond the sides of the carriage. On the upper ends of the pivot pins of the lifter arms 80 and 80' above the carriage, are loosely mounted arms 88 and 88', which extend outwardly beyond the sides of the carriage in different planes from the outwardly projecting arms of the levers 85 and 85'.

The lifters and droppers are moved at predetermined intervals in the proper order into operative position by vertically movable trips 89 and 89' mounted on opposite sides of the machine adjacent to the periphery of the sprocket or chain wheel 70, as shown in Figs. 1 and 4. These trips are connected by bell crank levers 90 with horizontally and transversely movable slides 91 which are provided at their inner ends with rollers 92 in the paths of alternately arranged high and low inclined wings or projections 93 and 94, on one side of the belt or chain 69, and low and high projections 95 and 96 on the opposite side of said belt or chain. The trips 89 and 89' and the slides 91 are retracted by the springs 97 coiled around the pivot pins of the bell crank levers 90, as shown in Fig. 1.

To permit the trip levers 85 and 85' and arms 88 and 88' to swing to the right, independently of the needle lifters 75, 75', 76 and 76', and droppers 81 and 81', as indicated by dotted lines in Fig. 21, when the carriage moves to the left, as indicated by dotted arrow, Fig. 1, so as to pass the trips 89, which have been raised during such movement of the carriage, and to swing them back to the left into their normal positions in which they will engage with said trips and be turned farther back to the left carrying the lifters and droppers into operative positions, as shown in Figs. 1 and 6, the hubs of said levers and arms are formed with segmental slots 101 into which studs 102 project from the pivot pins or stems of the lifter arms 79, 79', 80, and 80', and the levers 85, 85' and arms 88, and 88', are connected with the top carriage plates by springs 103 which tend to turn said levers and arms to the left and to hold them in their normal positions with the ends of the slots 101 in engagement with the pins 102, as shown by full lines in Fig. 21.

As shown in Fig. 8, the machine is supplied with needles 98 of a common form, having latches 99 and butts 100 for engagement with the actuating means.

For setting up a row of stitches in starting the machine, the usual or any suitable means for advancing alternate needles on the first two rounds will be supplied, but as such means does not constitute any part of or affect the present invention, they are not shown.

In the operation of the machine as herein shown and described after a number of rounds of straight knitting in which all or the same number of needles are employed in every round according to the usual operation of machines of this type, narrowing is effected as follows: The rocker shaft 24 making a complete oscillation to each complete reciprocation of the cam carriage to the right and left with each revolution of the driving shaft 6, the front row of needles knitting as the carriage moves in the direction indicated by full line arrows on Figs. 1 and 6, and the back row of needles knitting when the carriage moves in the opposite direction indicated by dotted arrows on the same figures, when the first high projection 93 and the first low projection 95 on the belt or chain 69 are brought by the sprocket or chain wheel 70 into engagement with the rollers 92 on opposite sides of said wheel, as shown in Fig. 4, the front trip 89 will be moved upward into the path of the front arm 88 and the rear trip 89' will be moved farther upward into the path of the rear lever 85', while the cam carriage is moving to the left, as indicated by dotted arrow, Fig. 1. As said front arm 88 and rear lever 85' pass to the left, they are turned by the trips 89 and 89' in a reverse direction into positions corresponding with that indicated by dotted lines in Fig. 21, without moving the lifters 76 and 75' and the dropper 81', with which they are connected, the slotted rod 87' connecting the lifter 75' and dropper 81' sliding on the pin which connects it with the arm 86'. As soon as said arm 88 and lever 85' clear the trips 89 and 89' they are turned back to the left into their normal positions by the springs 103. Upon its next movement to the right, as indicated by full line arrow, Fig. 1, the front arm 88 and the rear lever 85' will be turned back as shown in Figs. 4 and 6, thereby shifting the front needle lifter 76 and the rear needle lifter 75' with the connected dropper 81' into operative position in the normal paths of the needle butts 100 between the cams or guides 10, 11, 12 and 13, and 10', 11', 12' and 13'. Simultaneously with the above mentioned movement of the trips 89 and 89' the rear trip 65' is moved upwardly, as shown in Figs. 1 and 4, by the engagement of the first projection 68 on the inner side of the belt or chain 69 with the rear slide 66. As the cam carriage nears the limit of its movement to the left the arm 61 of the rear cam 59' engaging with the elevated trip 65', turns said cam into operative position against its stop 62, as shown by full lines in Fig. 6. Upon the next movement of the carriage to the right the rear cam 59' engaging with the pin or post 58, shifts the rear transfer point 52' forward, as shown in Figs. 1 and 4. Simultaneously with the forward movement of the rear transfer point 52', the first pair of end needles 98 at the left is advanced by the engagement of the rear and front lifters 75' and 76 with their butts 100, and by the turning of the lifter arms 79' and 80 as the carriage continues its movement to the right, the rear needle being lifted in advance of and farther than the front needle, as shown by Figs. 9, 10 and 13.

The several positions and operations of the rear transfer point 52' and a pair of needles coöperating therewith in transferring a loop from the rear needle to the front needle, throwing the rear needle out of action and casting off the loop from the front needle, as illustrated in Figs. 7 to 20 inclusive, correspond with the several positions of the cam carriage relative to said transfer point and pair of needles indicated on Fig. 6 by dotted lines which are designated by like reference letters $a$ to $k$ inclusive. The several corresponding positions and operations of the front transfer point 52 and a pair of needles coöperating therewith to transfer a loop from the front needle to the rear needle, throwing the front needle out of action and subsequently casting off such loop from the rear needle in the regular course of knitting, are illustrated by a reversal of Figs. 7 to 20, corresponding with successive positions of the cam carriage relative to said transfer point and pair of needles indicated on Fig. 6 by dotted lines designated by reference letters $b'$ to $k'$ inclusive.

While the transfer of loops both from rear needles to front needles and from front needles to rear needles is made during the movement of the cam carriage from left to right, indicated by full line arrow, Fig. 1, the loops so transferred are knitted off from the front needles during the same movement of the carriage, but from the rear needles they are knitted off in the next succeeding movement of the carriage from right to left, indicated by dotted arrow, Fig. 1.

As the rear transfer point 52' advances with the rear needle underneath it the loop held on said needle throws its latch 99 back, and the transfer point passes underneath the latch, as shown in Fig. 9. By the continued advance of the transfer point and needle the loop slides from the latch upon the transfer point, as shown in Figs. 10 and 11. At this point in the movement of the carriage indicated by the letter $d$ on Fig. 6, the lateral projections of the rear arm 53 and guide 55 engaging with each other, as shown in Fig. 1, turn the transfer point 52' into the position shown in Fig. 12, thereby spreading the loop held thereon and on the rear needle in position for the advancing front needle to enter and pass through it, as shown by Figs. 12, 13 and 14. The butt of the rear needle after leaving the lifter 75' at the inner upper end of the slot 77', is further advanced or lifted by the cam 13' till it reaches the apex of said cam, and the inner end of said needle is in the position shown by Fig. 13. The rear needle is then withdrawn by the passage of its butt through the inclined channel between the opposite side of the cam 13' and the cam 10' into the straight passage between said cams and the cam or guide 12', where it encounters the dropper 81', the two needles assuming the relative positions shown by Fig. 15. corresponding with the position of the carriage designated by the letter $f$ on Fig. 6. The front needle, which has reached the limit of its advance movement and has left the lifter 76 at the inner upper end of the slot 78, now carries two loops on its latch, the loop which it has received from the rear needle and the loop which it previously held. With the further movement of the carriage to the right the rear needle is carried by the dropper 81' out of action, its butt passing through the opening between the cams 11' and 12' at the lower outer end of the slot 82' below said cams, and leaving the dropper out of operative position below the normal path of the needle butts. The front needle is withdrawn by the cam 10 toward the cam or guide 11 and the two loops which it carries slip into the bight of its hook, the two needles assuming the relative positions in which they are shown in Fig. 16, when the carriage is at the point indicated by the letter $g$, Fig. 6. With the further movement of the carriage in the same direction the front needle successively assumes the positions in which it is shown in Figs. 17, 18, 19 and 20, corresponding with the positions of the carriage designated in Fig. 6 by the letters $h$, $i$, $j$ and $k$. As the butt of the needle passes up the ascending incline of the cam 9 the needle is thrust upwardly through the two loops, which open and clear the latch, as shown in Fig. 17. As the butt of the needle passes down the descending incline of the cam 9 the needle is withdrawn through the loops, yarn is fed by the carrier 14 between the latch and hook as shown in Fig. 18. The further withdrawal of the needle by the cam 10 pulls the latch through the loops and closes it, as shown in Fig. 19. As the butt of the needle passes the point of the cam 10 opposite the V-shaped recess in the cam 11, the needle is withdrawn from the two loops which it carries and draws the yarn held in the bight of its hook through said loops into another loop.

Upon the return movement of the carriage to the left, as indicated by dotted arrows on Figs. 1 and 6, the shanks of the front row of needles pass below the cam 9 in an unobstructed straight course between the cams or guides 10, 11 and 12, while the butts of the needles of the rear row pass upwardly over the rear cam 9', thence downwardly between it and the cam 10' into the V-shaped recess in the cam 11' and thence in a straight course between the cams or guides 10', 11' and 12', the rear needles knitting as they are withdrawn along the descending side of the cam 9' in the usual manner.

As the carriage moves to the left the positions of the front and rear trips 65, 65', 89 and 89' are reversed, the front trip 65 being raised into operative position while the rear trip 65' is lowered into inoperative position, and the front trip 89 being lifted by a high projection 96 on the belt or chain 69 into position to coöperate with the front lever 85, while the rear trip 89' is lifted by a low projection 94 on said belt or chain into position to coöperate with the rear arm 88'. Upon the next movement of the carriage to the right the front transfer point 52 with the corresponding pair of end needles are advanced and the operations substantially as hereinbefore described are repeated to transfer a loop from the end needle of the front row to the second needle in the rear row (which is then the active end needle, the first needle having been thrown out of action) and to then throw the first or end needle of the front row from which the loop has been removed, out of action. In the same movement of the carriage to the right the front row of needles knit as before in the usual manner, and in the next movement of the carriage to the left the rear row of needles knit and the two loops on the last needle to the left, one of which has been transferred thereto as above explained in the next preceding movement of the carriage to the right, are cast off.

After a loop has been transferred from the end needle of the rear row to the end needle of the front row and another loop from the end needle in the front row to the then opposite end needle in the rear row in the next succeeding movement of the carriage to the right, the transfer heads or blocks 17' with the points 52 and 52' are simultaneously advanced to the right by the action of the screw 18 into the proper position relative to the next set of needles for first transferring a loop from the next needle in the rear row to the next needle in the front row and from the latter needle to the second needle in the rear row, which is then the end needle of that row. In this manner loops are transferred alternately from end needles in the rear row to the opposite end needles in the front row and from the end needles in the front row to the opposite end needles in the rear row, and the needles from which the loops have been removed are then thrown out of action first from the rear row and then from the front row alternately as long as the narrowing continues. With the arrangement of the inclined wings or projections 44 and 45 on the belt or chain 43 and of the wings or projections 68, 93, 94, 95 and 96 on the belt or chain 69, shown in Figs. 1, 3 and 4, after the narrowing operation begins every two successive courses in which the transfer of loops and the dropping of needles takes place will be followed by two courses of plain knitting, until the narrowing is completed. The length of the link belts or chains and the number, grouping and arrangement of the wings or projections with which they are provided may be varied to produce any desired rate or degree and extent of narrowing.

As shown in Fig. 3, the first high wing or projection 44 has by engagement with the downwardly projecting arm of the pawl lifter 36, turned said lifter into position to release or lower the pawl 33, and said pawl has just turned the ratchet wheel 22 with the screw 18 an interval corresponding with the distance between two consecutive teeth of the ratchet wheel, and the transfer heads or blocks 17 and 17' have been advanced to the right an interval corresponding with the distance between consecutive pairs or sets of needles. With the next backward movement of the arm 29 on the rocker shaft 24 the ratchet wheel 49 will be turned by the pawl 48 an interval of one tooth, thereby carrying the first low wing or projection 45 into engagement with the rearwardly extending arm of the pawl lifter 36. The pawl 33 will thus be lifted out of operative position relative to the ratchet wheel 22 and will play idly during the next two courses of knitting until the next high wing or projection 44 engages with the downwardly projecting arm of the lifter 36, thereby releasing and lowering the pawl 33 into operative position. The pawl 33 will thus be thrown into and out of action intermittently while the wings or projections 44 and 45 are passing the lifter 36 and the transfer heads or blocks 17 will be intermittently advanced to the right after every two straight courses of plain knitting, dwelling each time during the two courses in which the transfer of loops and narrowing take place.

Any number of plain courses may be knitted with a constant number of needles before the narrowing begins, and any number of straight or plain courses may be knitted after the narrowing ends, with a smaller but constant number of needles, according to the length of the belt or chain 43 between the last of the series of wings or projections 44 and 45.

Various changes in the construction and arrangement of parts may be made to adapt the machine for different kinds of work, without departing from the principle and scope of the invention.

I claim:

1. In a knitting machine the combination with two parallel rows of needles, reciprocating cams for operating the needles of the two rows alternately, and a yarn carrier for feeding yarn to the needles, of means for alternately transferring a loop from the needle at one end of one row to the opposite needle of the other row, means for throwing the needle from which the loop has been removed out of action, and means for shifting said transferring means toward the opposite ends of the rows of needles.

2. In a knitting machine the combination with two parallel rows of needles pointing toward one another, reciprocating cams for operating the needles of the two rows alternately, and a yarn carrier for feeding yarn to the needles, of means for transferring loops from needles of one row to needles of the other row alternately, and means for shifting said transferring means lengthwise of the rows.

3. In a knitting machine the combination with two parallel rows of needles, reciprocating cams for operating the needles and a yarn carrier for feeding yarn thereto, of transfer points movable lengthwise of the rows of needles for transferring loops alternately from a needle of one row to the opposite needle of the other row, a screw for shifting the transfer points lengthwise of the machine, a pawl and ratchet wheel for turning the screw, a pawl lifter for throwing the pawl into and out of action, a chain wheel, means for rotating said wheel, and a link belt running on said chain wheel and provided with projections for operating the pawl lifter at predetermined intervals.

4. In a knitting machine the combination with two rows of needles, reciprocating cams for operating said needles and a yarn carrier for feeding yarn to the needles, of transfer points movable lengthwise of the machine and each adapted to transfer a loop from a needle of one row to a needle of the other row, a screw provided with reversely operating ratchet wheels and connected with said transfer points for shifting them lengthwise of the machine, reciprocating pawls arranged to turn said ratchet wheels in opposite directions, pawl lifters for throwing the pawls into and out of operative position, a chain wheel, means for rotating said wheel, and a link belt mounted on said chain wheel and provided with projections adapted by engagement with said pawl lifters to throw each pawl into and out of operative position at predetermined intervals.

5. In a knitting machine the combination with two rows of needles, reciprocating cams for operating said needles and a yarn carrier for feeding yarn to the needles, of a transfer point movable lengthwise of the needles and adapted to coöperate with a pair of needles in the two rows to transfer a loop from one to the other, a cam movable with and transversely to the needle cams for shifting the transfer point transversely to the travel of the needle cams, a trip movable into and out of position to shift the transfer-point cam into operative position, a chain wheel, means for rotating said wheel, and a link belt mounted on said chain wheel and provided with projections adapted to shift said trip at predetermined intervals into operative position.

6. In a knitting machine the combination with two parallel rows of needles, a reciprocating carriage provided with cams for operating the needles and a yarn carrier for feeding yarn to the needles, of a head or simultaneously advancing opposite needles in successive pairs at one end of the rows for transferring a loop from one needle to the other needle of a pair, an oscillatory transfer point mounted above one row of needles in a vertical plane parallel with the needles and movable transversely to the travel of the carriage underneath the latch of the advancing needle from which a loop is to be removed, means for advancing said transfer point toward the inner end of said needle, and means for turning said transfer point to one side after its advance to spread the loop on said needle for receiving the other advancing needle.

7. In a knitting machine the combination with two parallel rows of needles, a reciprocating carriage provided with cams for operating said needles and a yarn carrier for feeding yarn to the needles, of a head or block mounted above the carriage over one row of needles and provided with a vertically disposed transversely movable bearing, a stem rotatably mounted in said bearing and provided with a guiding arm and with a transfer point, a retracting spring for returning said bearing to and holding it in its normal position, guides on said head normally holding said arm and point in a vertical plane parallel with the needles, said arm and one of the guides being provided with interacting projections to turn the point to one side at the end of its advance movement transversely to the carriage, a retracting spring for turning said arm and point back to normal position when said bearing is returned to its original position, and means for shifting said bearing transversely toward the center of the machine at predetermined intervals.

8. In a knitting machine the combination with two parallel rows of needles, a reciprocating carriage provided with cams for operating the needles and a yarn carrier for feeding yarn to the needles, of a head or block mounted above the carriage over one row of needles and provided with a vertically disposed and transversely movable bearing, a stem rotatably mounted in said bearing and provided with a guiding arm and with a transfer point, a retracting spring tending to hold said bearing in its normal position, guides on said head normally holding said arm and point in a vertical plane parallel with the needles, said arm and one of said guides being provided with interacting projections to turn the point to one side at the end of its transverse movement toward the center of the machine, a retracting spring for turning said arm and point back to normal position when said bearing is retracted to its original position, a cam mounted on said carriage and movable into and out of the path of a projection on said bearing, and means for shifting said cam into operative position at predetermined intervals.

9. In a knitting machine the combination with two parallel rows of needles, a reciprocating carriage provided with cams for operating said needles and a yarn guide for feeding yarn to the needles, of bars guided and movable lengthwise in bearings on the machine frame above and parallel with the carriage, a screw connected with said bars and adapted when turned to move the same lengthwise, means for turning said screw at predetermined intervals and transfer points movably mounted on said bars and adapted to coöperate with a pair of opposite needles in the two rows for transferring a loop from a needle in one row to a needle in the other row.

10. In a knitting machine the combination with two parallel rows of needles, a reciprocating cam carriage provided with cams for operating the needles and a yarn carrier for feeding yarn to the needles, of a transfer point adapted to coöperate with a pair of opposite needles at one end of the rows to transfer a loop from one needle to the other, lifters movably mounted in opposite sides of the cam carriage to advance said pair of needles in the proper relation to each other and to the transfer point for transferring the loop from one needle to the other needle, trips movable into and out of position for shifting said lifters into operative position, a chain wheel, means for rotating said wheel, and a link belt mounted on said chain wheel and provided with projections adapted to throw said trips into operative position at predetermined intervals.

11. In a knitting machine the combination with parallel rows of needles, a reciprocating carriage provided with cams for operating said needles and a yarn carrier for feeding yarn to the needles, of transfer points each adapted to coöperate with a pair of opposite needles to transfer the loop from the end needle in one row to the corresponding end needle in the other row, means for alternately advancing the transfer points transversely to the travel of the carriage into operative position, means for shifting said transfer points parallel with the travel of the carriage at predetermined intervals to coöperate with successive sets of needles, lifters movably mounted in opposite sides of the cam carriage and adapted to advance opposite needles in pairs at one end of the rows to coöperate alternately with the transfer points, trips movable into and out of position to alternately shift the lifters on opposite sides of the carriage into operative position, a chain wheel, means for rotating said wheel, and a link belt mounted on said chain wheel and provided with projections for operating said trips alternately at predetermined intervals.

12. In a knitting machine the combination with two parallel rows of needles, a reciprocating carriage provided with cams for operating the needles and a yarn carrier for feeding yarn to the needles, of transfer points each adapted to transfer a loop from one of a pair of opposite needles to the other, lifters mounted on the carriage and movable into the normal path of the needle butts to advance a pair of opposite needles at one end of the rows to coöperate with said points alternately one at a time, droppers mounted on said carriage and movable into and out of the normal path of the needle butts and adapted to shift the end needles from which loops have been transferred out of operative position, and means for moving said lifters and droppers into operative position at predetermined intervals.

13. In a knitting machine the combination with two parallel rows of needles, a reciprocating carriage provided with cams for operating said needles and a yarn carrier for feeding yarn to the needles, of transfer points mounted above the carriage over the rows of needles and movable transversely to the travel of the carriage, means for alternately shifting said points into operative position at predetermined intervals, two lifters and a dropper mounted on each side of the carriage and movable into and out of the normal path of the needle butts on that side of the machine, and means for shifting one lifter and the dropper on one side of the carriage, and one lifter on the opposite side of the carriage into operative position alternately with the other lifters and dropper at predetermined intervals.

14. In a knitting machine the combination with two parallel rows of needles, a reciprocating carriage provided with cams for operating the needles and a yarn carrier for feeding yarn to the needles, of transfer points mounted above and movable transversely to the travel of the carriage, means for alternately moving said transfer points into operative position at predetermined intervals, two lifters and a dropper pivotally mounted on each side of the carriage and movable into and out of the normal path of the needle butts on that side of the machine, two arms pivotally mounted in different planes on each side of the carriage and connected one with one lifter and the dropper and the other with the other lifter on that side, trips each movable into the path of either of the pivoted arms on the corresponding side of the machine, a chain wheel, means for rotating said wheel, and a link belt mounted on said chain wheel and provided with projections extending therefrom different distances and in different planes for shifting said trips alternately into their different positions for operating said arms and the lifters and droppers connected therewith at predetermined intervals in the required order.

15. In a knitting machine the combination with two parallel rows of needles, a reciprocating carriage provided with cams for operating the needles and a yarn carrier for feeding yarn to the needles, of transfer points mounted above and movable transversely to the travel of the carriage, means for alternately moving said transfer points into operative position at predetermined intervals, two lifters and a dropper pivotally mounted on each side of the carriage and movable into and out of the normal path of the needle butts on that side of the machine, two arms mounted in different planes on each side of the carriage and connected one with one lifter and the dropper and the other with the other lifter on that side, trips each movable into the path of either of the pivoted arms on the corresponding side of the machine, cams movably mounted on the carriage for shifting the transfer points into operative position, trips movable into and out of position for shifting said cams, a chain wheel, means for rotating said wheels, and a link belt mounted on said chain wheel and provided with projections of different lengths in different planes for throwing said trips into operative position at predetermined intervals in the required order.

In witness whereof I hereto affix my signature in presence of two witnesses.

HERMAN PETERS.

Witnesses:
 CHAS. L. GOSS,
 LOUIS HEILBRONNER.